(12) United States Patent
Zhu et al.

(10) Patent No.: US 11,402,316 B2
(45) Date of Patent: Aug. 2, 2022

(54) DEVICE AND METHOD FOR MEASURING TWO-PHASE RELATIVE PERMEABILITY CURVE OF UNCONVENTIONAL OIL RESERVOIR

(71) Applicant: UNIVERSITY OF SCIENCE AND TECHNOLOGY BEIJING, Beijing (CN)

(72) Inventors: Weiyao Zhu, Beijing (CN); Debin Kong, Beijing (CN); Qinglin Shu, Dongying (CN); Haien Yang, Xi'an (CN); Kun Huang, Beijing (CN); Nan Li, Beijing (CN); Jing Xia, Beijing (CN)

(73) Assignee: UNIVERSITY OF SCIENCE AND TECHNOLOGY BEIJING, Beijing (CN)

( * ) Notice: Subject to any disclaimer, the term of this patent is extended or adjusted under 35 U.S.C. 154(b) by 0 days.

(21) Appl. No.: 17/531,920

(22) Filed: Nov. 22, 2021

(65) Prior Publication Data
US 2022/0082487 A1 Mar. 17, 2022

(30) Foreign Application Priority Data
Nov. 26, 2020 (CN) .......................... 202011347721.1

(51) Int. Cl.
*G01N 15/08* (2006.01)
(52) U.S. Cl.
CPC ..... *G01N 15/0826* (2013.01); *G01N 15/0806* (2013.01); *G01N 15/088* (2013.01);
(Continued)

(58) Field of Classification Search
CPC ........... G01N 15/0826; G01N 15/0806; G01N 15/088; G01N 15/08; G01N 15/0612;
(Continued)

(56) References Cited

U.S. PATENT DOCUMENTS

| | | | | |
|---|---|---|---|---|
| 4,884,438 A | * | 12/1989 | Jones | ................. G01N 15/0826 73/152.05 |
| 5,297,420 A | * | 3/1994 | Gilliland | .............. G01N 33/241 73/38 |

(Continued)

FOREIGN PATENT DOCUMENTS

| | | | |
|---|---|---|---|
| CN | 202947950 U | * | 5/2013 |
| CN | 103954511 A | | 7/2014 |

(Continued)

OTHER PUBLICATIONS

Tian, Wei, Study on the oil-gas-water multi-phase seepage law for tight sandstone condensate gas reservoir; Chinese doctoral dissertation full text database, Engineering Technology Part I, Issue 09, Sep. 15, 2015.

*Primary Examiner* — Hoa Q Pham
(74) *Attorney, Agent, or Firm* — IPRO, PLLC

(57) ABSTRACT

Device and method for measuring two-phase relative permeability curve of unconventional oil reservoir are provided, wherein the device comprises: two-dimensional porous seepage microscopic model; injection components connected to inlet end of the two-dimensional porous seepage microscopic model; confining pressure components arranged outside the two-dimensional porous seepage microscopic model; a camera component arranged on one side of the two-dimensional porous seepage microscopic model; back pressure components connected to outlet end of the two-dimensional porous seepage microscopic model; and outlet pressure measuring and recovery components connected to outlet end of the two-dimensional porous seepage microscopic model. Two-phase relative permeability curve of unconventional oil reservoir can be measured accurately through the device.

11 Claims, 8 Drawing Sheets

(52) U.S. Cl.
CPC ............... *G01N 2015/0833* (2013.01); *G01N 2015/0873* (2013.01)

(58) Field of Classification Search
CPC ....... G01N 15/0625; G01N 2015/0873; G01N 2015/0833; G01N 2015/0668; G01V 99/005; G01R 33/1223; G01R 33/14; G01R 33/1207
USPC ...................... 73/38, 813, 821; 356/432–440
See application file for complete search history.

(56) References Cited

U.S. PATENT DOCUMENTS

| | | | |
|---|---|---|---|
| 10,830,713 B2 * | 11/2020 | Zhang | .................. G01N 23/046 |
| 2017/0045642 A1 | 2/2017 | Khalid et al. | |

FOREIGN PATENT DOCUMENTS

| | | | | |
|---|---|---|---|---|
| CN | 106596336 A | * | 4/2017 | |
| CN | 108507920 A | | 9/2018 | |
| CN | 108593514 A | | 9/2018 | |
| CN | 108681638 A | | 10/2018 | |
| CN | 109268004 A | | 1/2019 | |
| CN | 109272845 A | * | 1/2019 | |
| CN | 109344493 A | | 2/2019 | |
| CN | 109556996 A | | 4/2019 | |
| CN | 111208048 A | | 5/2020 | |
| CN | 111239176 A | | 6/2020 | |
| CN | 211206162 U | | 8/2020 | |

\* cited by examiner

DEVICE AND METHOD FOR MEASURING TWO-PHASE RELATIVE PERMEABILITY CURVE OF UNCONVENTIONAL OIL RESERVOIR

TECHNICAL FIELD

The present disclosure relates to the technical field of oil and natural gas exploration and development, and in particular to a device and method for measuring two-phase relative permeability curve of unconventional oil reservoir.

BACKGROUND

The relative permeability curve reflects the different seepage ability of two phases fluids, such as gas-oil, oil-water or gas-water, etc., when they seep together in porous media. It is a basic method to describe the fluid seepage law in porous media, and it plays an important role in oil and gas field development and groundwater seepage.

SUMMARY

In one aspect, a device for measuring two-phase relative permeability curve of unconventional oil reservoir is provided. The device comprises: two-dimensional porous seepage microscopic model; injection components connected to the inlet end of the two-dimensional porous seepage microscopic model; confining pressure components arranged outside the two-dimensional porous seepage microscopic model; a camera component arranged on one side of the two-dimensional porous seepage microscopic model; back pressure components connected to the outlet end of the two-dimensional porous seepage microscopic model; and outlet pressure measuring and recovery components connected to the outlet end of the two-dimensional porous seepage microscopic model.

In at least one embodiment of the present disclosure, the injection components comprise an inlet pressure pump, intermediate containers connected to the outlet end of the inlet pressure pump, and an inlet valve and an inlet pressure gauge arranged between the intermediate containers and the inlet end of the two-dimensional porous seepage microscopic model. The intermediate containers comprise a first intermediate container and a second intermediate container arranged in parallel, a first valve is connected to the outlet end of the first intermediate container, and a second valve is connected to the outlet end of the second intermediate container.

In at least one embodiment of the present disclosure, the confining pressure components comprise: a confining pressure component arranged around the two-dimensional porous seepage microscopic model; a confining pressure pump connected to the confining pressure component; and a confining pressure gauge arranged between the confining pressure component and the confining pressure pump.

In at least one embodiment of the present disclosure, the back pressure components comprise: a back pressure valve connected to the outlet end of the two-dimensional porous seepage microscopic model; a back pressure pump connected to the back pressure valve, and a back pressure gauge arranged between the back pressure valve and the back pressure pump.

In at least one embodiment of the present disclosure, the outlet pressure measuring and recovery components comprise: an outlet valve and an outlet pressure gauge arranged between the outlet end of the two-dimensional porous seepage microscopic model and the back pressure valve, and a waste liquid collector connected to the back pressure valve.

In another aspect, a method for measuring two-phase relative permeability curve of unconventional oil reservoir is provided. The method comprises:

S1, selecting a target core, and making at least one two-dimensional porous seepage microscopic model according to the structure of the target core;

S2, determining starting pressure gradient of the two-dimensional porous seepage microscopic model and pressure loss caused by boundary effect of the two-dimensional porous seepage microscopic model;

S3, using the device for measuring two-phase relative permeability curve of unconventional oil reservoir as described in any of the above embodiments, to obtain relative permeability curve parameters through steady-state method or non-steady-state method; the relative permeability curve parameters comprise: oil phase relative permeability, water phase relative permeability, and oil saturation; wherein the two-dimensional porous seepage microscopic model in the device for measuring two-phase relative permeability curve of unconventional oil reservoir is made by step S1; and S4, drawing relative permeability curve according to the relative permeability curve parameters.

In at least one embodiment of the present disclosure, step S2 comprises:

S21, calculating the proportions of different pore diameters in the two-dimensional porous seepage microscopic model, and calculating characteristic capillary diameter corresponding to the two-dimensional porous seepage microscopic model by harmonic mean method;

S22, making a corresponding capillary model according to the characteristic capillary diameter;

S23, using the capillary model to measure thickness of boundary layer when oil phase flows under different pressure gradients, and drawing a curve of thickness of boundary layer changing with pressure gradients; and S24, using the capillary model to measure the flow rate of the oil phase under different pressure gradients and the flow rate of the water phase under different pressure gradients, and determining the starting pressure gradient of the oil phase and the starting pressure gradient of the water phase.

In at least one embodiment of the present disclosure, oil phase seepage formula considering starting pressure and boundary layer is $$u_o = \frac{K_o}{\mu_o}\left(1 - \frac{\delta}{r}\right)^4\left[\frac{\partial p}{\partial x} - \frac{8\tau_o}{3r\left(1 - \frac{\delta}{r}\right)} - G_o\right];$$

and water phase seepage formula considering starting pressure is $$u_w = \frac{K_w}{\mu_w}\left(\frac{\partial p}{\partial x} - G_w\right);$$

wherein, $u_o$ is oil phase flow rate, and unit is m/s;
$u_w$ is water phase flow rate, and unit is m/s;
$K_o$ is oil phase absolute permeability, and unit is mD;
$K_w$ is water phase absolute permeability, and unit is mD;
$\mu_o$ is oil phase viscosity, and unit is mPa·s;
$\mu_w$ is water phase viscosity, and unit is mPa·s;

δ is thickness of boundary layer, and unit is m;
r is characteristic capillary radius, and unit is m;

$$\frac{\partial p}{\partial x}$$

is pressure gradient, and unit is Pa/m;
$\tau_o$ is shear stress, and unit is Pa;
$G_o$ is starting pressure gradient of the oil phase, and unit is Pa/m;
$G_w$ is starting pressure gradient of the water phase, and unit is Pa/m;
when $$\eta = \frac{8\tau_o}{3r\left(1-\frac{\delta}{r}\right)};$$

then for coexistence of oil and water phases, calculation formula of pressure loss caused by boundary layer is $\eta_t = \eta \cdot S_o;$ wherein, $\eta$ is pressure drop per unit distance caused by boundary layer, and unit is MPa/m;
$\eta_t$ is additional pressure drop when oil saturation is $S_o$, and unit is MPa/m;
$S_o$ is oil saturation.

In at least one embodiment of the present disclosure, in step S3, obtaining relative permeability curve parameters through steady-state method comprises:

S311, using cleaning solution to clean two-dimensional porous seepage microscopic models; wherein the number of the two-dimensional porous seepage microscopic models is at least two;

S312, adjusting wettability of the two-dimensional porous seepage microscopic models to lipophilic;

S313, displacing in a two-dimensional porous seepage microscopic model according to a preset injection oil-water volume ratio, and displacing at least three times the size of pore volume; collecting images of oil phase area and water phase area changes in the two-dimensional porous seepage microscopic model, performing gray-scale processing on the collected images, and obtaining distribution of oil phase and water phase fluids according to the gray-scale processed images; when oil phase area and water phase area no longer change and the pressure does not change in the two-dimensional porous seepage microscopic model, obtaining the oil phase area, water phase flow rate when oil and water two phases exist, oil phase flow rate when oil and water two phases exist, and the pressure difference between the inlet end and the outlet end of the two-dimensional porous seepage microscopic model, and calculating a set of oil phase permeability and water phase permeability corresponding to the preset injection oil-water volume ratio;

S314, changing the injection oil-water volume ratio, repeating step S313, and obtaining different sets of oil phase permeability, water phase permeability and oil phase area corresponding to different injection oil-water volume ratios respectively;

S315, injecting water into another two-dimensional porous seepage microscopic model, and after the pressure difference between the inlet end and the outlet end of the two-dimensional porous seepage microscopic model remains unchanged, obtaining water phase flow rate and pressure difference between the inlet end and the outlet end of the two-dimensional porous seepage microscopic model when only water phase exists, and calculating absolute permeability of the two-dimensional porous seepage microscopic model; and S316, according to the absolute permeability of the two-dimensional porous seepage microscopic model and a set of oil phase permeability and water phase permeability corresponding to each injection oil-water volume ratio, respectively calculating oil phase relative permeability and water phase relative permeability corresponding to each injection oil-water volume ratio; according to oil phase area corresponding to each injection oil-water volume ratio, calculating oil saturation corresponding to each injection oil-water volume ratio.

In at least one embodiment of the present disclosure, calculation formula of oil phase permeability is $$K_o = \frac{q_o \mu_o l}{A(\Delta p - \eta_t \cdot L - G_o \cdot L)};$$

calculation formula of water phase permeability is $$K_w = \frac{q_w \mu_w l}{A(\Delta p - G_w \cdot L)};$$

calculation formula for absolute permeability of the two-dimensional porous seepage microscopic model is $$K = \frac{q_{w2} \mu_w l}{A(\Delta p - G_w \cdot L)};$$

calculation formula of oil phase relative permeability is $$K_{ro} = \frac{K_o}{K};$$

and calculation formula of water phase relative permeability is $$K_{rw} = \frac{K_w}{K};$$

wherein, A is area of cross section through which fluid flows, and unit is $m^2$;
$q_w$ is the water phase flow rate when oil and water two phases exist, and unit is $cm^3/s$;
$q_o$ is the oil phase flow rate when oil and water two phases exist, and unit is $cm^3/s$;
$q_{w2}$ is water phase flow when only water phase exists, and unit is $cm^3/s$;
$\Delta p$ is pressure difference between the inlet end and the outlet end of the two-dimensional porous seepage microscopic model, and unit is Pa;
$\eta_o$ is pressure drop per unit distance caused by oil phase boundary layer, and unit is Pa/m;
$\eta_t$ is additional pressure drop when oil saturation is $S_o$, and unit is Pa/m;
L is length of the two-dimensional porous seepage microscopic model, and unit is cm;

l is length of path through which fluid flows, and unit is cm;

$G_o$ is starting pressure gradient of the oil phase, and unit is Pa/m;

$G_w$ is starting pressure gradient of the water phase, and unit is Pa/m;

$\mu_o$ is oil phase viscosity, and unit is cp;

$\mu_w$ is water phase viscosity, and unit is cp;

$K_o$ is oil phase permeability, and unit is m$^2$;

$K_w$ is water phase permeability, and unit is m$^2$;

$K_{ro}$ is oil phase relative permeability;

$K_{rw}$ is water phase relative permeability; and

K is absolute permeability of the two-dimensional porous seepage microscopic model, and unit is m$^2$.

In at least one embodiment of the present disclosure, in step S3, obtaining relative permeability curve parameters through non-steady-state method comprises:

S321: using cleaning solution to clean two-dimensional porous seepage microscopic model;

S322: adjusting wettability of the two-dimensional porous seepage microscopic model to lipophilic;

S323, saturating the two-dimensional porous seepage microscopic model with crude oil;

S324: displacing crude oil in the two-dimensional porous seepage microscopic model with water at a constant speed, collecting multiple images of oil phase area and water phase area changes in the two-dimensional porous seepage microscopic model during the displacement process and recording pressure difference between the inlet end and the outlet end of the two-dimensional porous seepage microscopic model corresponding to each image collection and each image collection time; the displacement process will come to an end until the oil phase area and the water phase area in the two-dimensional porous seepage microscopic model no longer changes;

S325: performing gray-scale processing on each collected image, and obtaining distribution of oil phase and water phase fluids at the moment when the image is collected according to the gray-scale processed image;

S326: determining volume flow rate of oil phase and volume flow rate of water phase according to the distribution of oil phase and water phase fluids corresponding to different moments; and S327: calculating the oil phase relative permeability, the water phase relative permeability and the oil saturation corresponding to different moments.

In at least one embodiment of the present disclosure, calculation formula of oil phase relative permeability is $$K_{ro} = f_o \frac{d[1/W(t)]}{d\{1/[I_o \cdot W(t)]\}};$$

and calculation formula of water phase relative permeability is $$K_{rw} = (1 - f_o) \frac{d[1/W(t)]}{d\{1/[I_w \cdot W(t)]\}};$$

wherein, $$f_o = \frac{du_o(t)}{du(t)};$$

$$I_o = \frac{u/(\Delta p + \eta_t \cdot L + G_o \cdot L)}{u_b/(\Delta p_b - \eta_t L - G_o \cdot L)};$$

$$I_w = \frac{u/(\Delta p + G_w \cdot L)}{u_b/(\Delta p_b - G_w \cdot L)};$$

wherein, $K_{ro}$ is oil phase relative permeability;

$K_{rw}$ is water phase relative permeability;

$f_o$ is oil content;

W(t) is dimensionless cumulative injection up to time t, which is equal to the ratio of cumulative injection to pore volume;

$I_o$ is oil absorption capacity, a parameter that characterizes the flow capacity of oil phase;

$I_w$ is water absorption capacity, a parameter that characterizes the flow capacity of water phase;

$u_o(t)$ is oil production rate, and unit is m/s;

u(t) is injection velocity at the inlet of the two-dimensional porous seepage microscopic model, and unit is m/s;

u is flow rate of oil and water phases at the initial moment, which is numerically equal to injection flow rate, and unit is m/s;

$u_b$ is flow rate of oil and water phases at time t, and unit is m/s;

$\Delta p$ is pressure difference between inlet and outlet of the two-dimensional porous seepage microscopic model at time t, and unit is Pa;

$\Delta p_b$ is pressure difference between inlet end and outlet end of the two-dimensional porous seepage microscopic model at the initial moment, and unit is Pa;

$\eta_t$ is additional pressure drop when oil saturation is $S_o$, and unit is Pa/m;

$G_o$ is starting pressure gradient of the oil phase, and unit is Pa/m;

$G_w$ is starting pressure gradient of the water phase, and unit is Pa/m; and

L is length of the two-dimensional porous seepage microscopic model, and unit is m.

In at least one embodiment of the present disclosure, step S323 comprises:

keeping outlet valve of the device for measuring two-phase relative permeability curve of unconventional oil reservoir open, opening second valve and inlet valve, using inlet pressure pump to drive crude oil in second intermediate container into the two-dimensional porous seepage microscopic model to displace the crude oil used to change the wettability in the two-dimensional porous seepage microscopic model; and when the injection volume of crude oil is equal to the pore volume of the two-dimensional porous seepage microscopic model and the color of crude oil in each part of the two-dimensional porous seepage microscopic model is the same, ending the process of saturating the model with crude oil and closing the inlet valve.

In at least one embodiment of the present disclosure, the cleaning solution comprises potassium dichromate sulfuric acid lotion. The using cleaning solution to clean two-dimensional porous seepage microscopic model comprises: injecting potassium dichromate sulfuric acid lotion into the two-dimensional porous seepage microscopic model to clean impurities in the pores of the two-dimensional porous seepage microscopic model.

In at least one embodiment of the present disclosure, before adjusting wettability of the two-dimensional porous seepage microscopic model to lipophilic, step S3 further comprises: testing the air tightness of the device for measuring two-phase relative permeability curve of unconventional oil reservoir.

In at least one embodiment of the present disclosure, the testing the air tightness of the device for measuring two-phase relative permeability curve of unconventional oil reservoir comprises:

connecting the outlet end of the outlet valve to a vacuum pump;

opening the outlet valve of the device for measuring two-phase relative permeability curve of unconventional oil reservoir, and closing other valves; and using the vacuum pump to pump the two-dimensional porous seepage microscopic model to a vacuum of −0.1 MPa, and then standing for two~three hours to determine whether the pressure in the two-dimensional porous seepage microscopic model changes; when the pressure remains unchanged, the air tightness of the device for measuring two-phase relative permeability curve of unconventional oil reservoir is good.

In at least one embodiment of the present disclosure, the adjusting wettability of the two-dimensional porous seepage microscopic model to lipophilic comprises:

injecting crude oil with API degree less than 20 into the two-dimensional porous seepage microscopic model, and closing all valves after filling;

placing the two-dimensional porous seepage microscopic model for three days at the real environmental temperature of the reservoir where the target core is located, so as to adjust wettability of the two-dimensional porous seepage microscopic model to lipophilic.

BRIEF DESCRIPTION OF FIGURES

The drawings illustrate exemplary embodiments of the present disclosure and are used to explain the principles of the present disclosure together with their descriptions. These drawings are included to provide a further understanding of the present disclosure, and the drawings are included in this specification and constitute a part of this specification.

Figure 1:
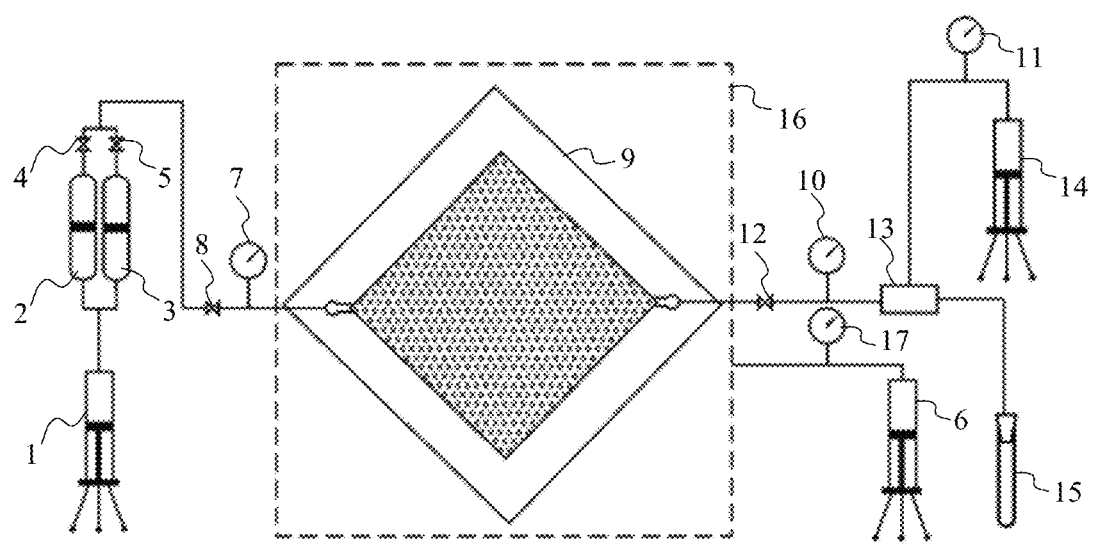
FIG. 1 is a schematic structural diagram of a device for measuring two-phase relative permeability curve of unconventional oil reservoir according to some embodiments.

In the figures: 1—inlet pressure pump, 2—first intermediate container, 3—second intermediate container, 4—first valve, 5—second valve, 6—confining pressure pump, 7—inlet pressure gauge, 8—inlet valve, 9—two-dimensional porous seepage microscopic model, 10—outlet pressure gauge, 11—back pressure gauge, 12—outlet valve, 13—back pressure valve, 14—back pressure pump, 15—waste liquid collector, 16—confining pressure component, 17—confining pressure gauge.

DETAILED DESCRIPTION

The disclosure will be further described in detail below with reference to the drawings and embodiments. It can be understood that the specific embodiments described herein are only used for explaining related content, rather than limiting the present disclosure. It should also be noted that, for ease of description, only parts related to the present disclosure are shown in the drawings.

It should be noted that the embodiments in the present disclosure and the features in the embodiments can be combined with each other without conflict. The disclosure will be described in detail below with reference to the drawings and in conjunction with the embodiments.

In the related art, the common methods for measuring the relative permeability curve are steady-state method and non-steady-state method.

In the steady-state method, two phases of fluid usually injected into the porous medium at a certain ratio at the inlet end of the porous medium, and when the flow state of the fluid in both phases at the outlet end is stable, the permeability of each phase can be calculated by using the Darcy seepage equation. For any phase, the relative permeability can be obtained by dividing the permeability of the phase by the absolute permeability of the porous medium. The remaining two-phase relative permeability can be obtained by changing the ratio of the two phases of fluid injected at the inlet end, then the relative permeability curve can be drawn.

In the non-steady-state method, a relative permeability curve is obtained through a displacement experiment. In the displacement experiment, the porous medium is first saturated by one phase, and then replaced by another phase. By obtaining the pressure difference between the inlet and outlet of the porous medium and the flow data of the two phases, the relative permeability of the two phases can be calculated using a specific formula, and the relative permeability curve can be drawn.

In the process of using the above two methods to measure the relative permeability curve, most of the porous media used are solid cores, and the seepage process of each phase fluid in the core is invisible, so the seepage process can only be described indirectly by the flow of the two-phase fluid, and the actual seepage process can only be inferred from the final phase permeability curve.

That is, in the traditional process of measuring the relative permeability curve, the relative permeability is obtained by the flow rate and pressure difference data at the outlet end, and the seepage process cannot be visually observed. Since various micro-interface phenomena have a huge influence on the relative permeability curve, the traditional measurement method of relative permeability curve can only obtain the result, but the specific micro-phenomenon that causes this result cannot be effectively characterized. Moreover, due to the complicated pipeline connections during the flow measurement process, there is a problem of large measurement errors. In addition, in the current oilfield development process, after the water flooding is completed, a large amount of remaining oil will be trapped in the porous medium, and other flooding agents, such as surfactants, will be injected later, so besides the relative permeability curve of water flooding, the relative permeability curve of other flooding agents is also very important. The oil displacement mechanism of these flooding agents is completely different from that of water flooding, and the traditional water flooding experiment cannot directly discover the influence of these mechanisms on relative permeability.

Based on this, the present disclosure provides a device and method for measuring two-phase relative permeability curve of unconventional oil reservoir.

As shown in FIG. 1, some embodiments of the present disclosure provide a device for measuring two-phase relative permeability curve of unconventional oil reservoir, which comprises: two-dimensional porous seepage microscopic model 9; injection components connected to the inlet end of the two-dimensional porous seepage microscopic model 9; confining pressure components arranged outside the two-dimensional porous seepage microscopic model 9; a camera component (not shown in FIG. 1) arranged on one side of the two-dimensional porous seepage microscopic model 9; back pressure components connected to the outlet end of the two-dimensional porous seepage microscopic model 9; and outlet pressure measuring and recovery components connected to the outlet end of the two-dimensional porous seepage microscopic model 9.

Optionally, the camera component is, for example, a camera, a microscope, etc., and the camera component may be connected to components such as an image processing device or a display. The camera component can capture the internal oil-water distribution and displacement process of the two-dimensional porous seepage microscopic model 9, and transmit the captured images to an image processing device, such as a computer processor, and the captured images can be recognized and processed by the image processing device to obtain the desired images. For example, the captured images can be processed by the image processing device through the gray-scale processing binarization method to obtain the planar distribution of the oil and water phases in the two-dimensional porous seepage microscopic model 9 during the displacement process.

According to the actual needs of those skilled in the art, the binarization process can be realized through a program built into the image processing device, and the recognition accuracy of binarization can be controlled by setting key parameters. It is understandable that the parameter configuration of each picture may also be different due to the influence of the shooting light. Therefore, in the processing process, the recognition parameters can be optimized to meet the requirements of the recognition accuracy.

In some embodiments, the injection components comprise an inlet pressure pump 1, intermediate containers connected to the outlet end of the inlet pressure pump 1, and an inlet valve 8 and an inlet pressure gauge 7 arranged between the intermediate containers and the inlet end of the two-dimensional porous seepage microscopic model 9. The intermediate containers comprise a first intermediate container 2 and a second intermediate container 3 arranged in parallel, a first valve 4 is connected to the outlet end of the first intermediate container 2, and a second valve 5 is connected to the outlet end of the second intermediate container 3. For example, the first intermediate container 2 may be used to contain formation water or surfactant for displacement, and the second intermediate container 3 may be used to contain crude oil.

In some embodiments, the confining pressure components comprise: a confining pressure component 16 arranged around the two-dimensional porous seepage microscopic model 9; a confining pressure pump 6 connected to the confining pressure component 16; and a confining pressure gauge 17 arranged between the confining pressure component 16 and the confining pressure pump 6. For the confining pressure component 16, a laboratory conventional confining pressure device can be selected according to actual needs to apply confining pressure to the two-dimensional porous seepage microscopic model 9, which is not limited in the present disclosure.

In some embodiments, the back pressure components comprise: a back pressure valve 13 connected to the outlet end of the two-dimensional porous seepage microscopic model 9; a back pressure pump 14 connected to the back pressure valve 13, and a back pressure gauge 11 arranged between the back pressure valve 13 and the back pressure pump 14.

In some embodiments, the outlet pressure measuring and recovery components comprise: an outlet valve 12 and an outlet pressure gauge 10 arranged between the outlet end of the two-dimensional porous seepage microscopic model 9 and the back pressure valve 13, and a waste liquid collector 15 connected to the back pressure valve 13.

The device for measuring two-phase relative permeability curve of unconventional oil reservoir provided by the present disclosure utilizes a combination of visualized two-dimensional porous seepage microscopic model 9 and a camera component, and can directly observe the displacement process through the camera component such as a microscope or a camera. By recognizing the image taken by the camera component, the relative permeability curve can be calculated, and the microscopic image can be combined to reflect the seepage law during the displacement process. The device for measuring two-phase relative permeability curve of unconventional oil reservoir provided by some embodiments of the present disclosure can realize the efficient combination of experimental phenomena and experimental rules in the relative permeability curve measurement process, and solve the problem that the seepage law can only be reversed through the measured relative permeability curve. When performing microscopic seepage experiments through the device for measuring two-phase relative permeability curve of unconventional oil reservoir, various experimental phenomena in the two-phase flow process can be directly observed. In addition, because the seepage area of the two phases can be directly obtained from image processing, the experimental data is more accurate, which reduces the problem of large errors in conventional displacement experiments, and has high accuracy and reflects the seepage law more accurately.

Some embodiments of the present disclosure also provide a method for measuring two-phase relative permeability curve of unconventional oil reservoir. The method comprises steps S1~S4.

S1, selecting a target core, and making at least one two-dimensional porous seepage microscopic model 9 according to the structure of the target core.

Exemplarily, a core that can reflect the characteristics of the reservoir to be studied is selected. If the core in the reservoir to be studied is a porous core, the target core with well-developed pores can be selected. If the core in the reservoir to be studied is fractured core, the target core with more fractures can be selected. The cores with other types of pores besides representative pores, for example, the core with mixed fractures and karst caves, should be avoided to be selected.

In the process of making a two-dimensional porous seepage microscopic model 9 according to the structure of the target core, the pore network distribution structure of the target core can be obtained by casting sheet technology, the pore network distribution structure of the target core can be used to make a mask, and the two-dimensional porous percolation microscopic model 9 can be made by means of photolithography and high-temperature sintering. Among them, the casting sheet is a rock sheet produced by injecting colored liquid glue into the pore space of the rock under vacuum pressure, and grinding after the liquid glue solidifies. Because the rock pores are filled with colored liquid glue, they are very eye-catching and easy to identify under the microscope. It provides an effective way to study the size, distribution, pore type, connectivity, combination characteristics and geometric shape of rock pores, and average pore throat ratio, average pore radius, throat, coordination number, fracture length and width, and fracture rate, etc.

S2, determining starting pressure gradient and pressure loss caused by boundary effect of the two-dimensional porous seepage microscopic model 9.

S3, using the device for measuring two-phase relative permeability curve of unconventional oil reservoir as described in any of the above embodiments, to obtain relative permeability curve parameters through steady-state method or non-steady-state method; the relative permeability curve parameters comprise: oil phase relative permeability, water phase relative permeability, and oil saturation; wherein the two-dimensional porous seepage microscopic model in the device for measuring two-phase relative permeability curve of unconventional oil reservoir is made by step S1.

S4, drawing relative permeability curve according to the relative permeability curve parameters.

The method for measuring two-phase relative permeability curve of unconventional oil reservoir provided by the present disclosure utilizes a visualized two-dimensional porous seepage microscopic model 9 in combination with a camera component, and can directly observe the displacement process through a camera component such as a microscope or a camera. Through the recognition of the image taken by the camera component, the relative permeability curve can be calculated, and the microscopic image can be combined to reflect the seepage law during the displacement process. The method for measuring two-phase relative permeability curve of unconventional oil reservoir provided by some embodiments of the present disclosure can realize the efficient combination of experimental phenomena and experimental rules in the relative permeability curve measurement process, and solve the problem that the seepage law can only be reversed through the measured relative permeability curve. Microscopic seepage experiments are carried out through the method for measuring two-phase relative permeability curve of unconventional oil reservoir, and it can directly observe various experimental phenomena in the two-phase flow process. Moreover, the method takes into account the possible starting pressure gradient and pressure loss caused by boundary effect in unconventional reservoir in the calculation process, so that the obtained experimental data is closer to the real situation of the formation, and the experimental results are more accurate. In addition, because the seepage area of the two phases can be directly obtained from image processing, the experimental data is more accurate, which reduces the problem of large errors in conventional displacement experiments, and has high accuracy and reflects the seepage law more accurately.

In some embodiments, step S2 comprises steps S21~S24.

S21, calculating the proportions of different pore diameters in the two-dimensional porous seepage microscopic model 9, and calculating characteristic capillary diameter corresponding to the two-dimensional porous seepage microscopic model 9 by harmonic mean method.

In this step, the characteristic capillary can represent the characteristics of the capillaries of the two-dimensional porous seepage microscopic model 9, and it is a type of capillary calculated by taking the harmonic mean of capillaries with different pore diameters according to the size and distribution frequency of capillary diameter in the two-dimensional porous seepage microscopic model 9. The characteristic capillary is used to simplify the calculation of parameters such as the thickness of the boundary layer.

S22, making a corresponding capillary model according to the characteristic capillary diameter.

Figure 2:
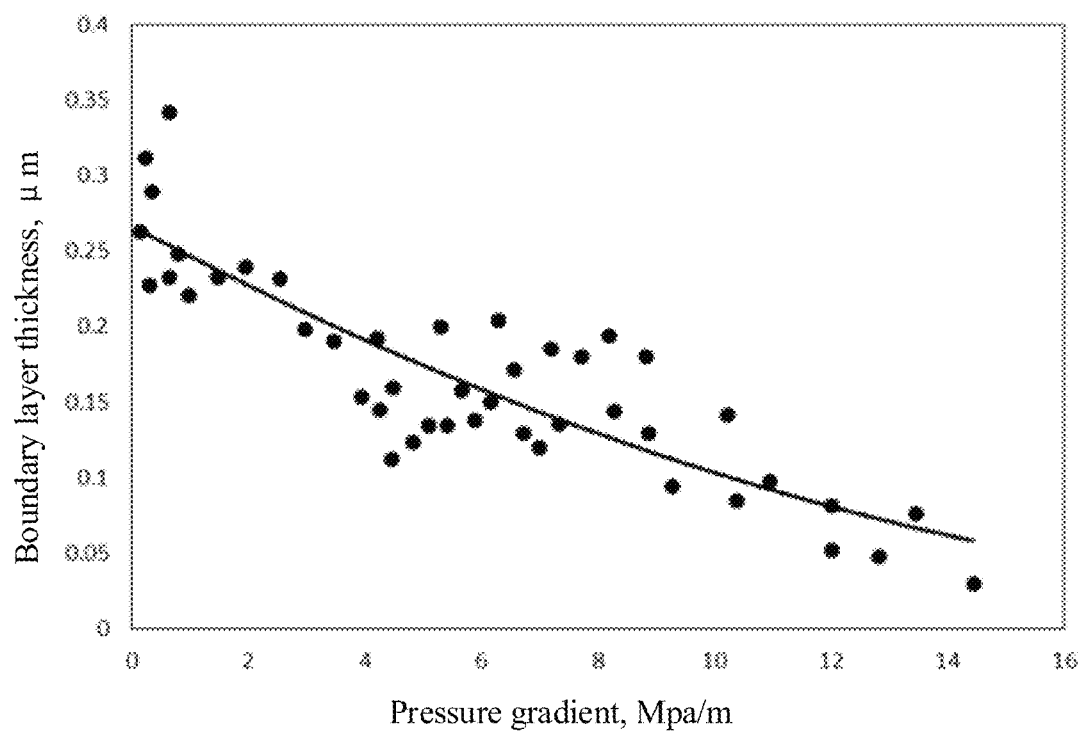
FIG. 2 is a graph of thickness of boundary layer changing with pressure gradient in a method for measuring two-phase relative permeability curve of unconventional oil reservoir according to some embodiments.

S23, using the capillary model to measure thickness of boundary layer, which can be observed observable through a microscope, when oil phase flows under different pressure gradients, and drawing a curve of thickness of boundary layer changing with pressure gradient, as shown in FIG. 2.

Figure 3:
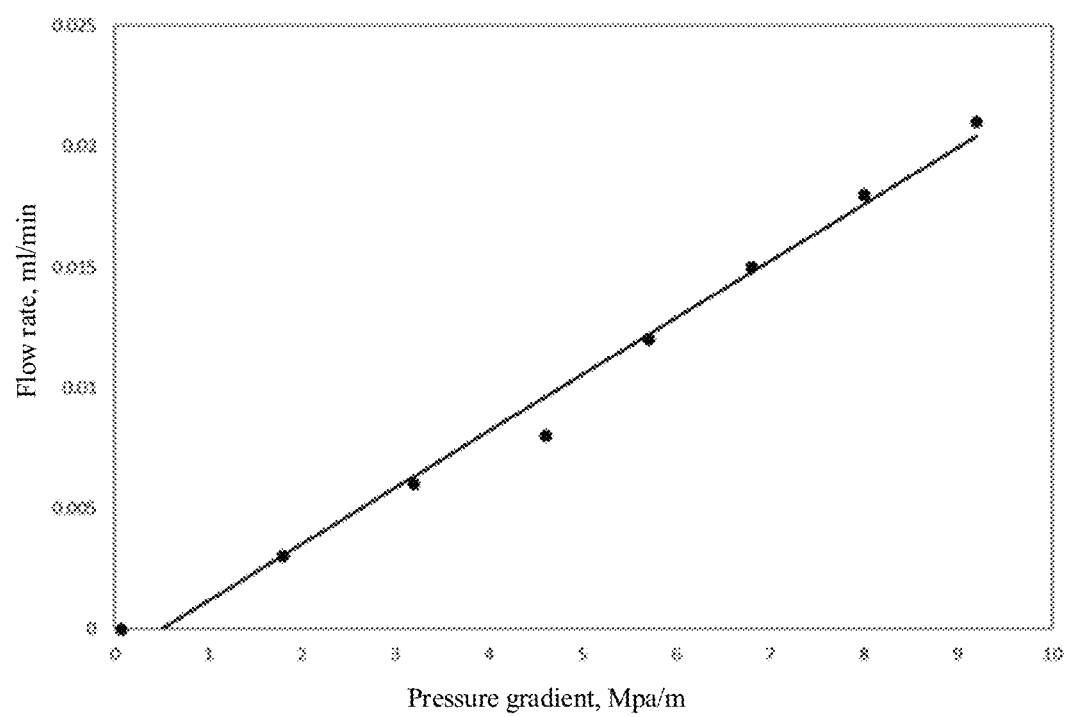
FIG. 3 is a diagram of starting pressure gradient of oil phase of a method for measuring two-phase relative permeability curve of unconventional oil reservoir according to some embodiments.

S24, using the capillary model to measure the flow rate of the oil phase under different pressure gradients and the flow rate of the water phase under different pressure gradients, and determining the starting pressure gradient of the oil phase and the starting pressure gradient of the water phase. Taking the starting pressure gradient of the oil phase as an example, as shown in FIG. 3, the intersection of the fitted line and the x-axis is the starting pressure gradient of the oil phase. The determination of the starting pressure gradient of the water phase is similar to that of the oil phase.

Due to the narrow pores in unconventional oil reservoir, after applying pressure to the fluid, the fluid will not flow immediately, but will begin to flow when the pressure is greater than a certain critical value. This critical value is the starting pressure gradient. In addition, oil is a non-Newtonian fluid. Under unconventional reservoir conditions, the oil stays on the solid surface to form a boundary layer. The thickness of the boundary layer is affected by pressure, and the presence of the boundary layer will cause additional pressure drop. Since water is a Newtonian fluid, the influence of the boundary layer does not need to be considered, but the pressure gradient need to be considered. For oil phase, both pressure gradient and boundary layer influence should be considered. Since the pressure does not all act to push the fluid movement during displacement, some of it is used to overcome the starting pressure gradient, and some of it is used to overcome the resistance caused by the boundary layer, so these additional pressures need to be removed.

In some embodiments, oil phase seepage formula considering starting pressure and boundary layer is formula (1-a);

$$u_o = \frac{K_o}{\mu_0}\left(1 - \frac{\delta}{r}\right)^4 \left[\frac{\partial p}{\partial x} - \frac{8\tau_o}{3\tau\left(1 - \frac{\delta}{r}\right)} - G_o\right] \quad (1\text{-a})$$

water phase seepage formula considering starting pressure is formula (1-b);

$$u_w = \frac{K_w}{\mu_w}\left(\frac{\partial p}{\partial x} - G_w\right) \quad (1\text{-}b)$$

wherein, $u_o$ is oil phase flow rate, and unit is m/s;
$u_w$ is water phase flow rate, and unit is m/s;
$K_o$ is oil phase absolute permeability, and unit is mD;
$K_w$ is water phase absolute permeability, and unit is mD;
$\mu_o$ is oil phase viscosity, and unit is mPa·s;
$\mu_w$ is water phase viscosity, and unit is mPa·s;
$\delta$ is thickness of boundary layer, and unit is m;
r is characteristic capillary radius, and unit is m;

$\frac{\partial p}{\partial x}$ is pressure gradient, and unit is Pa/m;
$\tau_o$ is shear stress, and unit is Pa;
$G_o$ is starting pressure gradient of the oil phase, and unit is Pa/m;
$G_w$ is starting pressure gradient of the water phase, and unit is Pa/m;
when $$\eta = \frac{8\tau_o}{3r\left(1 - \frac{\delta}{r}\right)} \quad (2)$$

then for coexistence of oil and water phases, calculation formula of pressure loss caused by boundary layer is formula (3);

$$\eta_t = \eta \cdot S_o \quad (3)$$

wherein, $\eta$ is pressure drop per unit distance caused by boundary layer, and unit is MPa/m;
$\eta_t$ is additional pressure drop when oil saturation is $S_o$, and unit is MPa/m;
$S_o$ is oil saturation.

In some embodiments, in step S3, obtaining relative permeability curve parameters through steady-state method comprises steps S311~S316.

S311, using cleaning solution to clean two-dimensional porous seepage microscopic models 9; wherein the number of the two-dimensional porous seepage microscopic models 9 is at least two.

In the process of making the two-dimensional porous seepage microscopic model 9, it is easy to mix glass impurities, and when drilling the injection hole in the two-dimensional porous seepage microscopic model 9, it is easy to mix into the engine oil. Therefore, glass impurities and engine oil will block the pores inside the model, affect the subsequent wettability modification and injection, and then affect the experimental results. Based on this, the cleaning solution can be used to clean the two-dimensional porous seepage microscopic model 9. Optionally, the cleaning solution comprises potassium dichromate sulfuric acid lotion. Using cleaning solution to clean two-dimensional porous seepage microscopic model 9 comprises: injecting potassium dichromate sulfuric acid lotion into the two-dimensional porous seepage microscopic model 9 to clean impurities in the pores of the two-dimensional porous seepage microscopic model 9. For example, the inlet pressure pump 1 can be used to provide power to inject potassium dichromate sulfuric acid lotion into the two-dimensional porous seepage microscopic model 9 through the first intermediate container 2 to clean impurities in the pores of the two-dimensional porous seepage microscopic model 9.

S312, adjusting wettability of the two-dimensional porous seepage microscopic model 9 to lipophilic.

In some embodiments, the two-dimensional porous seepage microscopic model 9 is made of glass, which has strong hydrophilicity, but part of the underground rocks has lipophilicity. For this type of research object, the wettability of the two-dimensional porous seepage microscopic model 9 needs to be changed. Exemplarily, adjusting wettability of the two-dimensional porous seepage microscopic model 9 to lipophilic comprises: injecting heavy crude oil into the two-dimensional porous seepage microscopic model 9, wherein the heavy crude oil is crude oil with API degree less than 20, and closing all valves after filling; placing the two-dimensional porous seepage microscopic model 9 for three days at the real environmental temperature of the reservoir where the target core is located, so as to adjust wettability of the two-dimensional porous seepage microscopic model 9 to lipophilic. For example, if the temperature of the reservoir where the target core is located is 200° C., then the two-dimensional porous seepage microscopic model 9 needs to be placed at 200° C. for three days.

S313, displacing in a two-dimensional porous seepage microscopic model 9 according to a preset injection oil-water volume ratio (e.g. oil-water volume ratio is 20:1), and displacing at least three times the size of pore volume; collecting images of oil phase area and water phase area changes in the two-dimensional porous seepage microscopic model 9, performing gray-scale processing on the collected images, and obtaining distribution of oil phase and water phase fluids according to the gray-scale processed images; when oil phase area and water phase area no longer change and the pressure does not change in the two-dimensional porous seepage microscopic model 9, obtaining the oil phase area, water phase flow rate when oil and water two phases exist, oil phase flow rate when oil and water two phases exist, and the pressure difference between the inlet end and the outlet end of the two-dimensional porous seepage microscopic model 9, and calculating a set of oil phase permeability and water phase permeability corresponding to the preset injection oil-water volume ratio. Among them, the oil phase area and the water phase area is determined by image recognition. After the displacement is stabilized, when the pressure of all the pressure gauges in the device for measuring two-phase relative permeability curve of unconventional oil reservoir basically no longer changes, the pressure does not change in the two-dimensional porous seepage microscopic model 9.

S314, changing the injection oil-water volume ratio, repeating step S313, and obtaining different sets of oil phase permeability, water phase permeability and oil phase area corresponding to different injection oil-water volume ratios respectively.

In this step, the oil-water volume ratio is, for example, 20:1, 10:1, 5:1, 1:1, 1:5, 1:10, etc. On this basis, the more data points, the more accurate the relative permeability curve is.

It can be understood that ervery time the injected oil-water volume ratio is changed, the two-dimensional porous seepage microscopic model 9 needs to be cleaned. Exemplarily, petroleum ether, alcohol, and nitrogen are sequentially injected into the two-dimensional porous seepage microscopic model 9 to clean it, and then the two-dimensional porous seepage microscopic model 9 is evacuated to prevent the previous experiment from affecting the subsequent experimental results.

S315, injecting water into another two-dimensional porous seepage microscopic model 9, and after the pressure difference between the inlet end and the outlet end of the two-dimensional porous seepage microscopic model 9 remains unchanged, obtaining water phase flow rate and pressure difference between the inlet end and the outlet end of the two-dimensional porous seepage microscopic model 9 when only water phase exists, and calculating absolute permeability of the two-dimensional porous seepage microscopic model 9.

S316, according to the absolute permeability of the two-dimensional porous seepage microscopic model 9 and a set of oil phase permeability and water phase permeability corresponding to each injection oil-water volume ratio, respectively calculating oil phase relative permeability and water phase relative permeability corresponding to each injection oil-water volume ratio; according to oil phase area corresponding to each injection oil-water volume ratio, calculating oil saturation corresponding to each injection oil-water volume ratio.

In some embodiments, before adjusting wettability of the two-dimensional porous seepage microscopic model 9 to lipophilic, step S3 further comprises: testing the air tightness of the device for measuring two-phase relative permeability curve of unconventional oil reservoir.

Exemplarily, testing the air tightness of the device for measuring two-phase relative permeability curve of unconventional oil reservoir comprises: connecting the outlet end of the outlet valve 12 to a vacuum pump; opening the outlet valve 12 of the device for measuring two-phase relative permeability curve of unconventional oil reservoir, and closing other valves; and using the vacuum pump to pump the two-dimensional porous seepage microscopic model 9 to a vacuum of −0.1 MPa, and then standing for two~three hours to determine whether the pressure in the two-dimensional porous seepage microscopic model 9 changes; when the pressure remains unchanged, the air tightness of the device for measuring two-phase relative permeability curve of unconventional oil reservoir is good.

In some embodiments, calculation formula of oil phase permeability is formula (4);

$$K_o = \frac{q_0 \mu_o l}{A(\Delta p - \eta_t \cdot L - G_o \cdot L)} \quad (4)$$

calculation formula of water phase permeability is formula (5);

$$K_w = \frac{q_w \mu_w l}{A(\Delta p - G_w \cdot L)} \quad (5)$$

calculation formula for absolute permeability of the two-dimensional porous seepage microscopic model is formula (6);

$$K = \frac{q_{w2} \mu_w l}{A(\Delta p - G_w \cdot L)} \quad (6)$$

calculation formula of oil phase relative permeability is formula (7);

$$K_{ro} = \frac{K_o}{K} \quad (7)$$

calculation formula of water phase relative permeability is formula (8);

$$K_{rw} = \frac{K_w}{K} \quad (8)$$

wherein, A is area of cross section through which fluid flows, and unit is $m^2$;

$q_w$ is the water phase flow rate when oil and water two phases exist, and unit is $cm^3/s$;

$q_o$ is the oil phase flow rate when oil and water two phases exist, and unit is $cm^3/s$;

$q_{w2}$ is water phase flow when only water phase exists, and unit is $cm^3/s$;

$\Delta p$ is pressure difference between the inlet end and the outlet end of the two-dimensional porous seepage microscopic model, and unit is Pa;

$\eta_o$ is pressure drop per unit distance caused by oil phase boundary layer, and unit is Pa/m;

$\eta_t$ is additional pressure drop when oil saturation is $S_o$, and unit is Pa/m;

L is length of the two-dimensional porous seepage microscopic model, and unit is cm;

l is length of path through which fluid flows, and unit is cm;

$G_o$ is starting pressure gradient of the oil phase, and unit is Pa/m;

$G_w$ is starting pressure gradient of the water phase, and unit is Pa/m;

$\mu_o$ is oil phase viscosity, and unit is cp;

$\mu_w$ is water phase viscosity, and unit is cp;

$K_o$ is oil phase permeability, and unit is $m^2$;

$K_w$ is water phase permeability, and unit is $m^2$;

$K_{ro}$ is oil phase relative permeability;

$K_{rw}$ is water phase relative permeability; and

K is absolute permeability of the two-dimensional porous seepage microscopic model 9, and unit is $m^2$.

Figure 7:
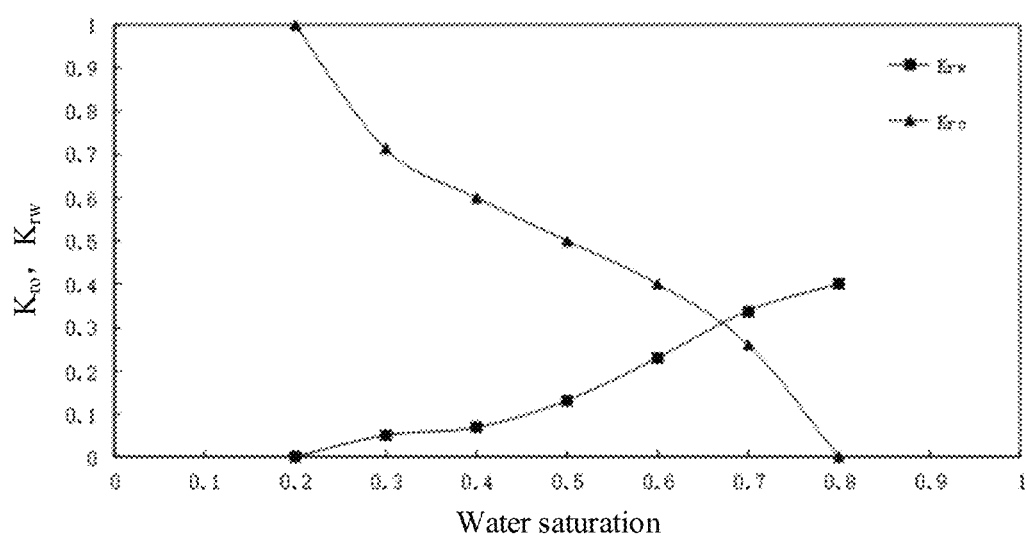
FIG. 7 is a relative permeability curve diagram of a method for measuring two-phase relative permeability curve of unconventional oil reservoir according to some embodiments.

As an example, the relative permeability curve parameters are obtained by the steady-state method, and the relative permeability curve drawn according to the relative permeability curve parameters can be seen in FIG. 7.

In some embodiments, in the step S3, obtaining relative permeability curve parameters through non-steady-state method comprises S321~S327.

S321: using cleaning solution to clean two-dimensional porous seepage microscopic model 9.

For example, the cleaning solution comprises potassium dichromate sulfuric acid lotion. Using cleaning solution to clean two-dimensional porous seepage microscopic model 9 comprises: injecting potassium dichromate sulfuric acid lotion into the two-dimensional porous seepage microscopic model 9 to clean impurities in the pores of the two-dimensional porous seepage microscopic model 9.

S322, adjusting wettability of the two-dimensional porous seepage microscopic model 9 to lipophilic.

In some embodiments, adjusting wettability of the two-dimensional porous seepage microscopic model 9 to lipophilic comprises: injecting crude oil with API degree less than 20 into the two-dimensional porous seepage microscopic model 9, and closing all valves after filling; placing the two-dimensional porous seepage microscopic model 9 for three days at the real environmental temperature of the reservoir where the target core is located, so as to adjust wettability of the two-dimensional porous seepage microscopic model 9 to lipophilic.

S323, saturating the two-dimensional porous seepage microscopic model 9 with crude oil.

Exemplarily, the step S323 comprises: keeping outlet valve 12 of the device for measuring two-phase relative permeability curve of unconventional oil reservoir open, opening second valve 5 and inlet valve 8, using inlet pressure pump to drive crude oil (crude oil in the underground environment where the target core is located) in second intermediate container 3 into the two-dimensional porous seepage microscopic model 9 to displace the crude oil used to change the wettability in the two-dimensional porous seepage microscopic model 9. Optionally, the displacement speed is kept at 0.005 ml/min. The process of saturating the model with crude oil will come to an end and the inlet valve 8 will be closed until the injection volume of crude oil is equal to the pore volume of the two-dimensional porous seepage microscopic model 9 and the color of crude oil in each part of the two-dimensional porous seepage microscopic model 9 is the same.

S324: displacing crude oil in the two-dimensional porous seepage microscopic model 9 with water at a constant speed, for example 0.005 ml/min~0.05 ml/min, collecting multiple images of oil phase area and water phase area changes in the two-dimensional porous seepage microscopic model 9 during the displacement process, and recording pressure difference between the inlet end and the outlet end of the two-dimensional porous seepage microscopic model 9 corresponding to each image collection and each image collection time; the displacement process will come to an end until the oil phase area and the water phase area in the two-dimensional porous seepage microscopic model 9 no longer changes.

Exemplarily, the inlet end of the two-dimensional porous seepage microscopic model 9 is connected to the outlet end of the first intermediate container with formation water inside. Turn on the injection pump, and the displacement is carried out at a constant speed. During the experiment, a high-definition camera was used to photograph the distribution of water and oil in the two-dimensional porous seepage microscopic model 9, and the pressure difference between the two ends of the two-dimensional porous seepage microscopic model 9 and the shooting time were recorded. When the images of the oil and water phases in the two-dimensional porous seepage microscopic model 9 remain unchanged for a long time, for example three to five minutes, the water flooding experiment ends and all valves are closed.

At present, in the oilfield development process, after the water flooding is completed, a large amount of remaining oil will be trapped in the porous medium, and other flooding agents, such as surfactants, will be injected later. Therefore, besides the relative permeability curve of water flooding, the relative permeability curve of other displacement agents is also very important. It is understandable that if the actual oilfield water flooding is completed and the surfactant is used for displacement, in step S324, the surfactant can be placed in the first intermediate container, and the surfactant can be used to displace crude oil in the two-dimensional porous seepage microscopic model 9. The oil displacement mechanism of displacement agents such as surfactant is not the same as that of water flooding. However, traditional water displacement experiments cannot directly discover the influence of these mechanisms on relative permeability. Therefore, by adopting the method for measuring two-phase relative permeability curve of unconventional oil reservoir provided by some embodiments of the present disclosure, it is possible to better observe the influence of surfactants and other displacement agents on the relative permeability during displacement.

S325: performing gray-scale processing on each collected image, and obtaining distribution of oil phase and water phase fluids at the moment when the image is collected according to the gray-scale processed image.

S326: determining volume flow rate of oil phase and volume flow rate of water phase according to the distribution of oil phase and water phase fluids corresponding to different moments.

In the process of gray-scale processing of the collected images, the images are first processed into image frames, and then key image frames are selected according to a certain time interval, and all data is obtained from these key image frames. For the selection of key image frames, since a large number of images will be taken during the experiment, which increases the workload of image recognition and calculation, some images can be appropriately deleted. For example, when the injected water does not reach the outlet end of the two-dimensional porous seepage microscopic model 9, a key image frame is selected every three to four images; after the water is discharged from the outlet end of the two-dimensional porous seepage microscopic model 9, a key image frame is selected for each image interval; at the end of the displacement, a key image frame is selected every five to six images. This can greatly reduce the workload of data processing while ensuring the accuracy of the collected data. The data processing of key image frame is carried out by gray image method. For the images collected at different times, by scanning each image, the oil phase area and the water phase area at the time of collecting the image is obtained.

Figure 4:
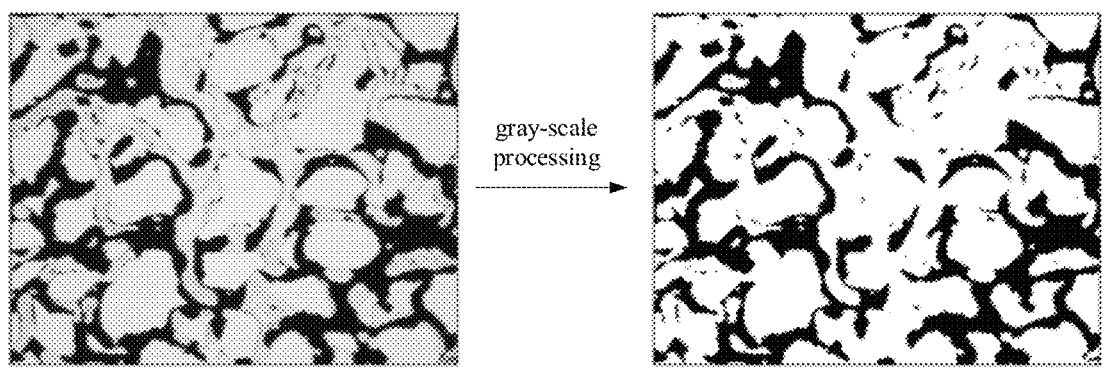
FIG. 4 is a schematic diagram of oil phase area and water phase area changes in two-dimensional porous seepage microscopic model at time $T_o$ of a method for measuring two-phase relative permeability curve of unconventional oil reservoir according to some embodiments.
Figure 5:
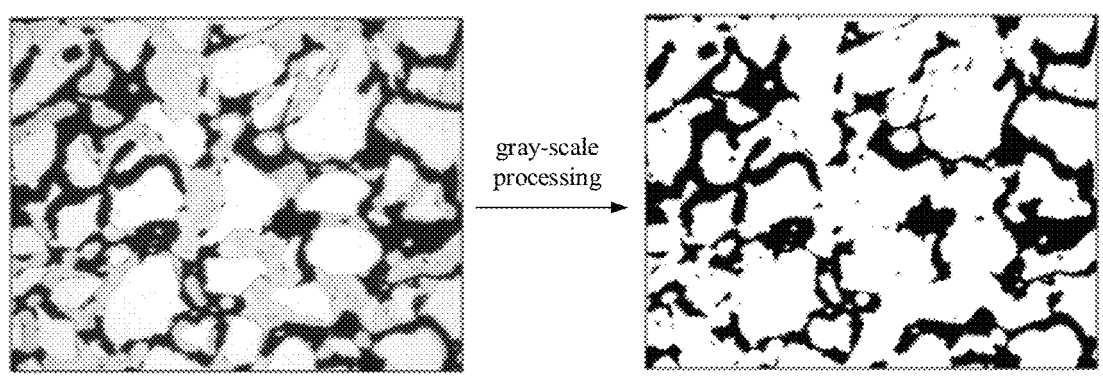
FIG. 5 is a schematic diagram of oil phase area and water phase area changes in two-dimensional porous seepage microscopic model at time $T_1$ of a method for measuring two-phase relative permeability curve of unconventional oil reservoir according to some embodiments.
Figure 6:
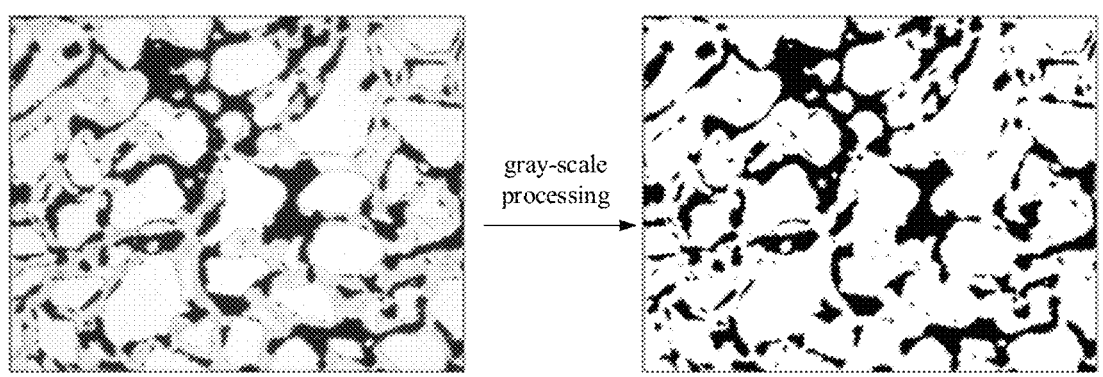
FIG. 6 is a schematic diagram of oil phase area and water phase area changes in two-dimensional porous seepage microscopic model at time $T_2$ of a method for measuring two-phase relative permeability curve of unconventional oil reservoir according to some embodiments.

Exemplarily, as shown in FIGS. 4-6, FIGS. 4-6 respectively show the changes in the oil phase area and the water phase area in the two-dimensional porous seepage microscopic model 9 at $T_0$, $T_1$, and $T_2$. After gray-scale processing, the black part in the figures represents the distribution of the oil phase. It can be seen from the figures that from $T_0$ to $T_2$, the oil phase area ranges from 7,232,655 pixels at time $T_o$, to 7,06065 pixels at time $T_1$, and then to 599,887 pixels at time $T_2$. The oil phase area gradually decreases under water flooding.

By multiplying the oil phase area with the height of the pore, the oil phase volume at that moment can be obtained. By multiplying the water phase area with the height of the pore, the water phase volume at that moment can be obtained. After that, by calculating the difference between the oil phase volume at the last moment and that at this moment, the volume change of oil phase can be obtained, and then the oil phase volume flow rate can be obtained. Similarly, by calculating the difference between the water phase volume at the last moment and that at this moment, the volume change of water phase can be obtained, and then the water phase volume flow rate can be obtained.

S327: calculating the oil phase relative permeability, the water phase relative permeability and the oil saturation corresponding to different moments.

In some embodiments, similar to the steady-state method, in the non-steady-state method, before adjusting wettability of the two-dimensional porous seepage microscopic model 9 to lipophilic, step S3 further comprises: testing the air tightness of the device for measuring two-phase relative permeability curve of unconventional oil reservoir.

Exemplarily, testing the air tightness of the device for measuring two-phase relative permeability curve of unconventional oil reservoir comprises: connecting the outlet end of the outlet valve 12 to a vacuum pump; opening the outlet valve 12 of the device for measuring two-phase relative permeability curve of unconventional oil reservoir, and closing other valves; and using the vacuum pump to pump the two-dimensional porous seepage microscopic model 9 to a vacuum of −0.1 MPa, and then standing for two~three hours to determine whether the pressure in the two-dimensional porous seepage microscopic model 9 changes; when the pressure remains unchanged, the air tightness of the device for measuring two-phase relative permeability curve of unconventional oil reservoir is good.

In some embodiments, calculation formula of oil phase relative permeability is formula (9);

$$K_{ro} = f_o \frac{d[1/W(t)]}{d\{1/[I_o \cdot W(t)]\}} \quad (9)$$

calculation formula of water phase relative permeability is formula (10);

$$K_{rw} = (1 - f_o) \frac{d[1/W(t)]}{d\{1/[I_w \cdot W(t)]\}} \quad (10)$$

wherein, $$f_0 = \frac{du_o(t)}{du(t)} \quad (11)$$

$$I_o = \frac{u/(\Delta p + \eta_t \cdot L + G_o \cdot L)}{u_b/(\Delta p_b - \eta_t L - G_o \cdot L)} \quad (12)$$

$$I_w = \frac{u/(\Delta p + G_w \cdot L)}{u_b/(\Delta p_b - G_w \cdot L)} \quad (13)$$

wherein, $K_{ro}$ is oil phase relative permeability;

$K_{rw}$ is water phase relative permeability;

$f_o$ is oil content;

W(t) is dimensionless cumulative injection up to time t, which is equal to the ratio of cumulative injection to pore volume;

$I_o$ is oil absorption capacity, a parameter that characterizes the flow capacity of oil phase;

$I_w$ is water absorption capacity, a parameter that characterizes the flow capacity of water phase;

$u_o(t)$ is oil production rate, and unit is m/s; $u_o(t)$ can be obtained through the reduction of the black area in the two-dimensional porous seepage microscopic model per unit time;

u(t) is injection velocity at the inlet of the two-dimensional porous seepage microscopic model, and unit is m/s;

u is flow rate of oil and water phases at the initial moment, which is numerically equal to injection flow rate, and unit is m/s;

$u_b$ is flow rate of oil and water phases at time t, and unit is m/s;

Δp is pressure difference between inlet and outlet of the two-dimensional porous seepage microscopic model at time t, and unit is Pa;

$\Delta p_b$ is pressure difference between inlet end and outlet end of the two-dimensional porous seepage microscopic model at the initial moment, and unit is Pa;

$\eta_t$ is additional pressure drop when oil saturation is $S_o$, and unit is Pa/m;

$G_o$ is starting pressure gradient of the oil phase, and unit is Pa/m;

$G_w$ is starting pressure gradient of the water phase, and unit is Pa/m; and

L is length of the two-dimensional porous seepage microscopic model, and unit is m.

Figure 8:
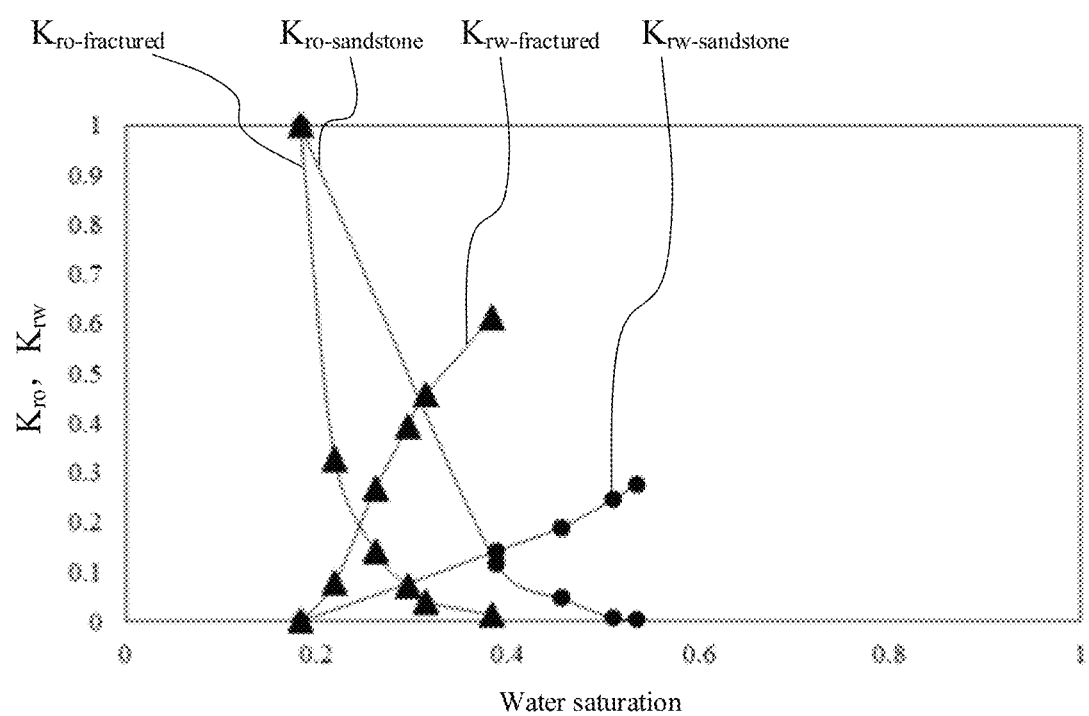
FIG. 8 is another relative permeability curve diagram of a method for measuring two-phase relative permeability curve of unconventional oil reservoir according to some embodiments.

The method for measuring two-phase relative permeability curve of unconventional oil reservoir provided by some embodiments of the present disclosure can realize the visualization of the relative permeability curve measurement process. Through high-precision camera equipment, capture the oil-water distribution and laws during the displacement process, and clarify the actual oil-water distribution characteristics corresponding to each point in the relative permeability curve. Especially for some special form of relative permeability curves, it can visually show the reasons for the special forms, and can organically unify the relative permeability curves and their corresponding seepage laws, and no longer use the results to hypothesize the reason, but directly observe. For example, FIG. 8 shows a relative permeability curve obtained by a method for measuring two-phase relative permeability curve of unconventional oil reservoir according to some embodiments of the present disclosure. This figure shows the comparison of the relative permeability curves of the same core before and after fracturing. It can be seen that after fracturing, the seepage channel widens, and the relative permeability curve of the water phase will protrude upward, which is different from the original one without fracturing. This is a special form of relative permeability curve.

In addition, in the measurement, different types of pores will also form different forms of relative permeability curves. Moreover, during the measurement process, the peeling of the rock particles will also change the curve shape. Injecting different fluids, such as polymers, will also change the shape of the curve. The method for measuring two-phase relative permeability curve of unconventional oil reservoir provided by some embodiments of the present disclosure can intuitively show what causes the change of the curve shape, and can organically unify the relative permeability curve and its corresponding seepage law, and directly observe the reason instead of assuming the reverse reason through the result.

In the traditional relative permeability curve measurement process, due to the complexity of connecting pipelines and other factors, there are many measurement errors that are not clear, which will affect the measured relative permeability curve. The device and method for measuring two-phase relative permeability curve of unconventional oil reservoir provided by some embodiments of the present disclosure can improve the relative permeability curve measurement from non-visualization to visualization, which can effectively reduce measurement errors and improve the difficulty of error elimination due to invisibility.

In the description of this specification, the description with reference to the terms "one embodiment/mode", "some embodiments/modes", "examples", "specific examples", or "some examples" etc. that the specific features, structures, materials or characteristics described in combination with the embodiments/modes or examples are included in at least one embodiment/method or example of the present application. In this specification, the schematic representations of the aforementioned terms do not necessarily refer to the same embodiment/mode or example. Moreover, the described specific features, structures, materials or characteristics can be combined in any one or more embodiments/modes or examples in a suitable manner. In addition, those skilled in the art can combine the different embodiments/modes or examples and the features of the different embodiments/modes or examples described in this specification without contradicting each other.

In addition, the terms "first" and "second" are used only for the purpose of description and cannot be understood as indicating or implying relative importance or implicitly indicating the number of technical features indicated. Therefore, the features defined with "first" and "second" may explicitly or implicitly include at least one of the features. The orientation or positional relationship indicated by the terms "inlet end" and "outlet end" are based on the orientation or positional relationship shown in the drawings, which is only for the convenience of describing the invention and simplifying the description, rather than indicating or implying that the device or element referred to must have a specific orientation, be constructed and operated in a specific orientation, so it cannot be understood as a limitation of the present disclosure. At the same time, in the description of the present disclosure, unless otherwise clearly stipulated and limited, the terms "connected" and "connection" should be understood in a broad sense, for example, they may be fixed connection, detachable connection, or integral connection; It can be a mechanical connection or an electrical connection; and it can be directly connected or indirectly connected through an intermediate medium. For those of ordinary skill in the art, the specific meaning of the above-mentioned terms in the present disclosure can be understood according to specific circumstances.

Those skilled in the art should understand that the above-mentioned embodiments are only for clearly illustrating the present disclosure, rather than limiting the scope of the present disclosure. For those skilled in the art, other changes or modifications can be made on the basis of the above disclosure, and these changes or modifications are still within the scope of the present disclosure.

What is claimed is:

1. A method for measuring two-phase relative permeability curve of unconventional oil reservoir, characterized in that the method comprises:
   S1, selecting a target core, and making at least one two-dimensional porous seepage microscopic model according to structure of the target core;
   S2, determining starting pressure gradient of the two-dimensional porous seepage microscopic model and pressure loss caused by boundary effect of the two-dimensional porous seepage microscopic model;
   S3, using a device for measuring two-phase relative permeability curve of unconventional oil reservoir; wherein, the device comprises: two-dimensional porous seepage microscopic model; injection components connected to inlet end of the two-dimensional porous seepage microscopic model; confining pressure components arranged outside the two-dimensional porous seepage microscopic model; a camera component arranged on one side of the two-dimensional porous seepage microscopic model; back pressure components connected to outlet end of the two-dimensional porous seepage microscopic model; and outlet pressure measuring and recovery components connected to outlet end of the two-dimensional porous seepage microscopic model, to obtain relative permeability curve parameters through steady-state method; the relative permeability curve parameters comprise: oil phase relative permeability, water phase relative permeability, and oil saturation; wherein the two-dimensional porous seepage microscopic model in the device for measuring two-phase relative permeability curve of unconventional oil reservoir is made by step S1; and
   S4, drawing relative permeability curve according to the relative permeability curve parameters;
   wherein, step S2 comprises:
   S21, calculating proportions of different pore diameters in the two-dimensional porous seepage microscopic model, and calculating characteristic capillary diameter corresponding to the two-dimensional porous seepage microscopic model by harmonic mean method;
   S22, making a corresponding capillary model according to the characteristic capillary diameter;
   S23, using the capillary model to measure thickness of boundary layer when oil phase flows under different pressure gradients, and drawing a curve of thickness of boundary layer changing with pressure gradients; and
   S24, using the capillary model to measure flow rate of oil phase under different pressure gradients and flow rate of water phase under different pressure gradients, and determining starting pressure gradient of the oil phase and starting pressure gradient of the water phase.

2. The method for measuring two-phase relative permeability curve of unconventional oil reservoir according to claim 1, which characterized in that, oil phase seepage formula considering starting pressure and boundary layer is $$u_o = \frac{K_o}{\mu_0}\left(1 - \frac{\delta}{r}\right)^4\left[\frac{\partial p}{\partial x} - \frac{8\tau_o}{3\tau\left(1 - \frac{\delta}{r}\right)} - G_o\right];$$

and water phase seepage formula considering starting pressure is $$u_w = \frac{K_w}{\mu_w}\left(\frac{\partial p}{\partial x} - G_w\right);$$

wherein, $u_o$ is oil phase flow rate, and unit is m/s;
$u_w$ is water phase flow rate, and unit is m/s;
$K_o$ is oil phase absolute permeability, and unit is mD;
$K_w$ is water phase absolute permeability, and unit is mD;
$\mu_o$ is oil phase viscosity, and unit is mPa·s;
$\mu_w$ is water phase viscosity, and unit is mPa·s;
$\delta$ is thickness of boundary layer, and unit is m;
r is characteristic capillary radius, and unit is m;

$$\frac{\partial p}{\partial x}$$

is pressure gradient, and unit is Pa/m;
$\tau_o$ is shear stress, and unit is Pa;
$G_o$ is starting pressure gradient of the oil phase, and unit is Pa/m;
$G_w$ is starting pressure gradient of the water phase, and unit is Pa/m;

when $$\eta = \frac{8\tau_o}{3r\left(1-\frac{\delta}{r}\right)};$$

then for coexistence of oil and water phases, calculation formula of pressure loss caused by boundary layer is $$\eta_t = \eta \cdot S_o;$$

wherein, η is pressure drop per unit distance caused by boundary layer, and unit is MPa/m;
$\eta_t$ is additional pressure drop when oil saturation is $S_o$, and unit is MPa/m;
$S_o$ is oil saturation.

3. The method for measuring two-phase relative permeability curve of unconventional oil reservoir according to claim 1, which characterized in that, in step S3, obtaining relative permeability curve parameters through steady-state method comprises:

S311, using cleaning solution to clean two-dimensional porous seepage microscopic models; wherein number of the two-dimensional porous seepage microscopic models is at least two;

S312, adjusting wettability of the two-dimensional porous seepage microscopic models to lipophilic;

S313, displacing in a two-dimensional porous seepage microscopic model according to a preset injection oil-water volume ratio, and displacing at least three times size of pore volume; collecting images of oil phase area and water phase area changes in the two-dimensional porous seepage microscopic model, performing gray-scale processing on collected images, and obtaining distribution of oil phase and water phase fluids according to gray-scale processed images; when oil phase area and water phase area no longer change and the pressure does not change in the two-dimensional porous seepage microscopic model, obtaining the oil phase area, water phase flow rate when oil and water two phases exist, oil phase flow rate when oil and water two phases exist, and the pressure difference between inlet end and outlet end of the two-dimensional porous seepage microscopic model, and calculating a set of oil phase permeability and water phase permeability corresponding to the preset injection oil-water volume ratio;

S314, changing the injection oil-water volume ratio, repeating step S313, and obtaining different sets of oil phase permeability, water phase permeability and oil phase area corresponding to different injection oil-water volume ratios respectively;

S315, injecting water into another two-dimensional porous seepage microscopic model, and after pressure difference between inlet end and outlet end of the two-dimensional porous seepage microscopic model remains unchanged, obtaining water phase flow rate and pressure difference between inlet end and outlet end of the two-dimensional porous seepage microscopic model when only water phase exists, and calculating absolute permeability of the two-dimensional porous seepage microscopic model; and S316, according to the absolute permeability of the two-dimensional porous seepage microscopic model and a set of oil phase permeability and water phase permeability corresponding to each injection oil-water volume ratio, respectively calculating oil phase relative permeability and water phase relative permeability corresponding to each injection oil-water volume ratio; according to oil phase area corresponding to each injection oil-water volume ratio, calculating oil saturation corresponding to each injection oil-water volume ratio.

4. The method for measuring two-phase relative permeability curve of unconventional oil reservoir according to claim 3, which characterized in that, calculation formula of oil phase permeability is $$K_o = \frac{q_0 \mu_0 l}{A(\Delta p - \eta_t \cdot L - G_o \cdot L)};$$

calculation formula of water phase permeability is $$K_w = \frac{q_w \mu_w l}{A(\Delta p - G_w \cdot L)};$$

calculation formula for absolute permeability of the two-dimensional porous seepage microscopic model is $$K = \frac{q_{w2} \mu_w l}{A(\Delta p - G_w \cdot L)};$$

calculation formula of oil phase relative permeability is $$K_{ro} = \frac{K_o}{K};$$

calculation formula of water phase relative permeability is $$K_{rw} = \frac{K_w}{K};$$

wherein, A is area of cross section through which fluid flows, and unit is m²;
$q_w$ is the water phase flow rate when oil and water two phases exist, and unit is cm³/s;
$q_o$ is the oil phase flow rate when oil and water two phases exist, and unit is cm³/s;
$q_{w2}$ is water phase flow when only water phase exists, and unit is cm³/s;
Δp is pressure difference between the inlet end and the outlet end of the two-dimensional porous seepage microscopic model, and unit is Pa;
$\eta_0$ is pressure drop per unit distance caused by oil phase boundary layer, and unit is Pa/m;
$\eta_t$ is additional pressure drop when oil saturation is $S_o$, and unit is Pa/m;
L is length of the two-dimensional porous seepage microscopic model, and unit is cm;
l is length of path through which fluid flows, and unit is cm;
$G_o$ is starting pressure gradient of the oil phase, and unit is Pa/m;
$G_w$ is starting pressure gradient of the water phase, and unit is Pa/m;

$\mu_o$ is oil phase viscosity, and unit is cp;
$\mu_w$ is water phase viscosity, and unit is cp;
$K_o$ is oil phase permeability, and unit is m²;
$K_w$ is water phase permeability, and unit is m²;
$K_{ro}$ is oil phase relative permeability;
$K_{rw}$ is water phase relative permeability; and
K is absolute permeability of the two-dimensional porous seepage microscopic model, and unit is m².

5. The method for measuring two-phase relative permeability curve of unconventional oil reservoir according to claim 3, which characterized in that, the adjusting wettability of the two-dimensional porous seepage microscopic model to lipophilic comprises:
  injecting crude oil with API degree less than 20 into the two-dimensional porous seepage microscopic model, and closing all valves after filling;
  placing the two-dimensional porous seepage microscopic model for three days at real environmental temperature of reservoir where the target core is located, so as to adjust wettability of the two-dimensional porous seepage microscopic model to lipophilic.

6. A method for measuring two-phase relative permeability curve of unconventional oil reservoir, characterized in that the method comprises:
  S1, selecting a target core, and making at least one two-dimensional porous seepage microscopic model according to structure of the target core;
  S2, determining starting pressure gradient of the two-dimensional porous seepage microscopic model and pressure loss caused by boundary effect of the two-dimensional porous seepage microscopic model;
  S3, using a device for measuring two-phase relative permeability curve of unconventional oil reservoir; wherein, the device comprises: two-dimensional porous seepage microscopic model; injection components connected to inlet end of the two-dimensional porous seepage microscopic model; confining pressure components arranged outside the two-dimensional porous seepage microscopic model; a camera component arranged on one side of the two-dimensional porous seepage microscopic model; back pressure components connected to outlet end of the two-dimensional porous seepage microscopic model; and outlet pressure measuring and recovery components connected to outlet end of the two-dimensional porous seepage microscopic model, to obtain relative permeability curve parameters through non-steady-state method; the relative permeability curve parameters comprise: oil phase relative permeability, water phase relative permeability, and oil saturation; wherein the two-dimensional porous seepage microscopic model in the device for measuring two-phase relative permeability curve of unconventional oil reservoir is made by step S1; and
  S4, drawing relative permeability curve according to the relative permeability curve parameters;
  wherein, step S2 comprises:
  S21, calculating proportions of different pore diameters in the two-dimensional porous seepage microscopic model, and calculating characteristic capillary diameter corresponding to the two-dimensional porous seepage microscopic model by harmonic mean method;
  S22, making a corresponding capillary model according to the characteristic capillary diameter;
  S23, using the capillary model to measure thickness of boundary layer when oil phase flows under different pressure gradients, and drawing a curve of thickness of boundary layer changing with pressure gradients; and
  S24, using the capillary model to measure flow rate of oil phase under different pressure gradients and flow rate of water phase under different pressure gradients, and determining starting pressure gradient of the oil phase and starting pressure gradient of the water phase.

7. The method for measuring two-phase relative permeability curve of unconventional oil reservoir according to claim 6, which characterized in that, oil phase seepage formula considering starting pressure and boundary layer is $$u_o = \frac{K_o}{\mu_0}\left(1-\frac{\delta}{r}\right)^4\left[\frac{\partial p}{\partial x} - \frac{8\tau_o}{3r\left(1-\frac{\delta}{r}\right)} - G_o\right];$$

and water phase seepage formula considering starting pressure is $$u_w = \frac{K_w}{\mu_w}\left(\frac{\partial p}{\partial x} - G_w\right);$$

wherein, $u_o$ is oil phase flow rate, and unit is m/s;
$u_w$ is water phase flow rate, and unit is m/s;
$K_o$ is oil phase absolute permeability, and unit is mD;
$K_w$ is water phase absolute permeability, and unit is mD;
$\mu_o$ is oil phase viscosity, and unit is mPa·s;
$\mu_w$ is water phase viscosity, and unit is mPa·s;
$\delta$ is thickness of boundary layer, and unit is m;
r is characteristic capillary radius, and unit is m;

$$\frac{\partial p}{\partial x}$$

is pressure gradient, and unit is Pa/m;
$\tau_o$ is shear stress, and unit is Pa;
$G_o$ is starting pressure gradient of the oil phase, and unit is Pa/m;
$G_w$ is starting pressure gradient of the water phase, and unit is Pa/m;
when $$\eta = \frac{8\tau_o}{3r\left(1-\frac{\delta}{r}\right)};$$

then for coexistence of oil and water phases, calculation formula of pressure loss caused by boundary layer is $$\eta_t = \eta \cdot S_o;$$

wherein, $\eta$ is pressure drop per unit distance caused by boundary layer, and unit is MPa/m;
$\eta_t$ is additional pressure drop when oil saturation is $S_o$, and unit is MPa/m;
$S_o$ is oil saturation.

8. The method for measuring two-phase relative permeability curve of unconventional oil reservoir according to claim 6, which characterized in that, in step S3, obtaining relative permeability curve parameters through non-steady-state method comprises:

S321: using cleaning solution to clean two-dimensional porous seepage microscopic model;
S322: adjusting wettability of the two-dimensional porous seepage microscopic model to lipophilic;
S323, saturating the two-dimensional porous seepage microscopic model with crude oil;
S324: displacing crude oil in the two-dimensional porous seepage microscopic model with water at a constant speed, collecting multiple images of oil phase area and water phase area changes in the two-dimensional porous seepage microscopic model during displacement process, and recording pressure difference between inlet end and outlet end of the two-dimensional porous seepage microscopic model corresponding to each image collection and each image collection time; the displacement process will come to an end until the oil phase area and the water phase area in the two-dimensional porous seepage microscopic model no longer changes;
S325: performing gray-scale processing on each collected image, and obtaining distribution of oil phase and water phase fluids at the moment when the image is collected according to gray-scale processed image;
S326: determining volume flow rate of oil phase and volume flow rate of water phase according to the distribution of oil phase and water phase fluids corresponding to different moments; and
S327: calculating the oil phase relative permeability, the water phase relative permeability and the oil saturation corresponding to different moments.

9. The method for measuring two-phase relative permeability curve of unconventional oil reservoir according to claim 8, which characterized in that, calculation formula of oil phase relative permeability is $$K_{ro} = f_o \frac{d[1/W(t)]}{d\{1/[I_o \cdot W(t)]\}};$$

and calculation formula of water phase relative permeability is $$K_{rw} = (1 - f_o) \frac{d[1/W(t)]}{d\{1/[I_w \cdot W(t)]\}};$$

wherein, $$f_o = \frac{du_o(t)}{du(t)};$$

$$I_o = \frac{u/(\Delta p + \eta_t \cdot L + G_o \cdot L)}{u_b/(\Delta p_b - \eta_t \cdot L - G_o \cdot L)};$$

$$I_w = \frac{u/(\Delta p + G_w \cdot L)}{u_b/(\Delta p_b - G_w \cdot L)};$$

wherein, $K_{ro}$ is oil phase relative permeability; $K_{rw}$ is water phase relative permeability; $f_o$ is oil content;

W(t) is dimensionless cumulative injection up to time t, which is equal to the ratio of cumulative injection to pore volume;
$I_o$ is oil absorption capacity, a parameter that characterizes flow capacity of oil phase;
$I_w$ is water absorption capacity, a parameter that characterizes flow capacity of water phase;
$u_o(t)$ is oil production rate, and unit is m/s;
u(t) is injection velocity at the inlet of the two-dimensional porous seepage microscopic model, and unit is m/s;
u is flow rate of oil and water phases at initial moment, which is numerically equal to injection flow rate, and unit is m/s;
$u_b$ is flow rate of oil and water phases at time t, and unit is m/s;
Δp is pressure difference between inlet and outlet of the two-dimensional porous seepage microscopic model at time t, and unit is Pa;
$\Delta p_b$ is pressure difference between inlet end and outlet end of the two-dimensional porous seepage microscopic model at the initial moment, and unit is Pa;
$\eta_t$ is additional pressure drop when oil saturation is $S_o$, and unit is Pa/m;
$G_o$ is starting pressure gradient of the oil phase, and unit is Pa/m;
$G_w$ is starting pressure gradient of the water phase, and unit is Pa/m; and
L is length of the two-dimensional porous seepage microscopic model, and unit is m.

10. The method for measuring two-phase relative permeability curve of unconventional oil reservoir according to claim 8, which characterized in that, step S323 comprises:
keeping outlet valve of the device for measuring two-phase relative permeability curve of unconventional oil reservoir open, opening second valve and inlet valve, using inlet pressure pump to drive crude oil in second intermediate container into the two-dimensional porous seepage microscopic model to displace crude oil used to change wettability in the two-dimensional porous seepage microscopic model; and
when the injection volume of crude oil is equal to pore volume of the two-dimensional porous seepage microscopic model and color of crude oil in each part of the two-dimensional porous seepage microscopic model is the same, ending the process of saturating the model with crude oil and closing the inlet valve.

11. The method for measuring two-phase relative permeability curve of unconventional oil reservoir according to claim 8, which characterized in that, the adjusting wettability of the two-dimensional porous seepage microscopic model to lipophilic comprises:
injecting crude oil with API degree less than 20 into the two-dimensional porous seepage microscopic model, and closing all valves after filling;
placing the two-dimensional porous seepage microscopic model for three days at real environmental temperature of reservoir where the target core is located, so as to adjust wettability of the two-dimensional porous seepage microscopic model to lipophilic.

* * * * *